(12) United States Patent
Kramer

(10) Patent No.: US 9,074,534 B2
(45) Date of Patent: Jul. 7, 2015

(54) CLAMSHELL SEAL

(71) Applicant: George J. Kramer, Tolland, CT (US)

(72) Inventor: George J. Kramer, Tolland, CT (US)

(73) Assignee: UNITED TECHNOLOGIES CORPORATION, Hartford, CT (US)

(*) Notice: Subject to any disclaimer, the term of this patent is extended or adjusted under 35 U.S.C. 154(b) by 305 days.

(21) Appl. No.: 13/630,748

(22) Filed: Sep. 28, 2012

(65) Prior Publication Data
US 2014/0091529 A1 Apr. 3, 2014

(51) Int. Cl.
F16J 15/02 (2006.01)
F02C 7/28 (2006.01)
F02K 1/80 (2006.01)

(52) U.S. Cl.
CPC .. F02C 7/28 (2013.01); F02K 1/805 (2013.01)

(58) Field of Classification Search
USPC .......... 277/607, 616, 630, 637, 641, 644
See application file for complete search history.

(56) References Cited

U.S. PATENT DOCUMENTS

| | | | | |
|---|---|---|---|---|
| 180,416 A | * | 8/1876 | Clow | 285/398 |
| 1,762,766 A | * | 6/1930 | De Garay | 285/331 |
| 3,483,665 A | * | 12/1969 | Miller | 52/461 |
| 3,686,747 A | * | 8/1972 | Bagnulo | 29/508 |
| 3,796,057 A | * | 3/1974 | Dougherty | 405/251 |
| 4,290,612 A | * | 9/1981 | Frosch et al. | 277/345 |
| 4,558,892 A | * | 12/1985 | Daw et al. | 285/331 |
| 4,577,579 A | * | 3/1986 | Williams | 114/274 |
| 4,669,762 A | * | 6/1987 | Jenkins | 285/331 |
| 4,747,750 A | | 5/1988 | Chlus et al. | |
| 4,836,451 A | | 6/1989 | Herrick et al. | |
| 4,941,693 A | * | 7/1990 | Spaude et al. | 285/331 |
| 5,125,796 A | * | 6/1992 | Cromer | 415/174.2 |
| 5,470,112 A | * | 11/1995 | Keating | 285/24 |
| 5,706,646 A | | 1/1998 | Wilde et al. | |
| 6,113,158 A | * | 9/2000 | Bocchicchio et al. | 285/331 |
| 6,371,524 B1 | * | 4/2002 | Noda | 285/110 |
| 7,748,752 B2 | * | 7/2010 | Kobler et al. | 285/371 |
| 7,909,570 B2 | | 3/2011 | Durocher et al. | |
| 8,616,007 B2 | * | 12/2013 | Charron | 60/796 |

* cited by examiner

Primary Examiner — Vishal Patel
(74) Attorney, Agent, or Firm — Carlson, Gaskey & Olds

(57) ABSTRACT

A seal for a duct having an upstream portion and a downstream portion, the duct upstream portion and the duct downstream portion separated by a first gap, includes a first portion having a length greater than a width of the first gap between the first portion and the second portion, the first portion having a first thickness, a first upstream end and a first downstream end; a second portion having a length greater than a width of the gap between the first portion and the second portion, the second portion having a second thickness, a second upstream end and a second downstream end; and an attachment between the first portion and the second portion such that the first portion and the second portion move relative to each other, wherein the first portion is inside the duct and the second portion is outside of the duct.

12 Claims, 3 Drawing Sheets

CLAMSHELL SEAL

BACKGROUND

Operating temperatures of gasses in and passing from combustors of gas turbine engines are typically quite high, requiring cooled liners in the combustors and downstream thereof to avoid damage to the internal parts of the engines. Cooling is typically provided by a compressor upstream of the combustor. To maximize engine efficiency, it is desirable to use the minimal amount of cooling air necessary to maintain the integrity of the liners and not to allow any cooling air leakage.

Leakage may occur between mating or adjacent components and seals. Tight tolerances between such mating or adjacent components are typically employed to minimize such leakage.

SUMMARY OF THE INVENTION

According to a non-limiting embodiment disclosed herein, a seal for a duct having an upstream portion and a downstream portion, the duct upstream portion and the duct downstream portion separated by a first gap, includes a first portion having a length greater than a width of the first gap between the first portion and the second portion, the first portion having a first thickness, a first upstream end and a first downstream end; a second portion having a length greater than a width of the gap between the first portion and the second portion, the second portion having a second thickness, a second upstream end and a second downstream end; and an attachment between the first portion and the second portion such that the first portion and the second portion move relative to each other wherein the first portion is inside the duct and the second portion is outside of the duct.

According to any previous claim, a second gap is disposed between the first upstream portion and the second upstream portion wherein the second gap is smaller than a thickness of the duct upstream portion.

According to any previous claim, a third gap is disposed between the first downstream portion and the second downstream portion wherein the third gap is smaller than a thickness of the duct upstream portion.

According to any previous claim, a third gap is disposed between the first downstream portion and the second downstream portion wherein the third gap is smaller than a thickness of the duct upstream portion.

According to any previous claim, the first thickness is thicker than the second thickness.

According to any previous claim, the second thickness is thinner than the first thickness.

According to any previous claim, the second thickness is thinner than the first thickness and is disposed in a higher pressure environment than a lower pressure environment in which the first thickness is disposed.

According to any previous claim, each of the upstream ends and the downstream ends have rotation points that rotate the first portion and the second portion about the duct upstream portion and the duct downstream portion.

According to any previous claim, one of the first portion and the second portion are disposed radially inwardly within the duct, the one of the first portion and the second portion having an extension extending distally beyond the a rotation point on either of the upstream end or the downstream end.

According to any previous claim, the first portion and the second portion are spring loaded against the duct upstream portion and the duct downstream portion.

According to any previous claim, the attachment includes a first finger extending from the first portion towards the second portion, a second finger extending from the second portion towards the first portion, and an axle extending through the first finger and the second finger about which the first and second finger may rotate.

According to any previous claim, the second portion is segmented into first members to maintain a seal if the duct is curved wherein two adjacent members are defined by a cleft.

According to any previous claim, the cleft is covered by a band attaching to one of the adjacent first members and is forced against another of the adjacent first members by pressure.

According to any previous claim, wherein the first portion is segmented into second members to maintain a seal if the duct is curved.

According to any previous claim, wherein each the first portion and the second portion are arcuate, and a concave side of the first portion faces a concave side of the second portion.

According to a further non-limiting embodiment disclosed herein, a seal for sealing a first gap between a higher temperature, lower pressure first flow path and a lower temperature higher pressure second flow path in a gas turbine engine, the seal includes a first portion having a length greater than a width of the first gap, the first length disposed in the higher temperature, lower pressure first flow, the first portion having a first thickness, a first upstream end and a first downstream end; a second portion having a length greater than a width of the gap the second portion disposed in the higher pressure, lower temperature second flow, the second portion having a second thickness, a first upstream end and a first downstream end; and an attachment between the first portion and the second portion such that the first portion and the second portion move relative to each other.

According to any previous claim, wherein the first thickness is thicker than the second thickness.

According to any previous claim, wherein each of the upstream ends and the downstream ends have rotation points for rotating the first portion and the second portion about a first edge or a second edge, wherein the gap is formed between the first edge and the second edge.

According to any previous claim, the first portion and the second portion are spring loaded against the first edge and the second edge.

According to any previous claim, wherein the attachment includes a first finger extending from the first portion towards the second portion, a second finger extending from the second portion towards the first portion, and an axle extending through the first finger and the second finger about which the first and second finger rotate.

According to any previous claim, wherein each the first portion and the second portion are arcuate, and a concave side of the first portion faces a concave side of the second portion.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
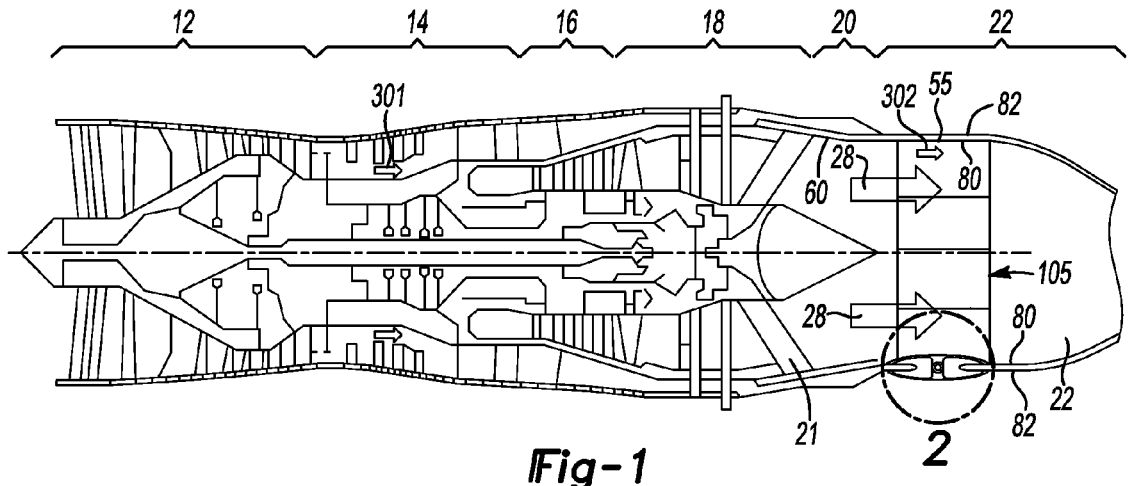
FIG. 1 is a sectional view of a gas turbine engine that incorporates an exemplary embodiment disclosed herein.

Referring to FIG. 1, a gas turbine engine 10 includes a fan section 12, a compressor section 14, a combustor section 16, and a turbine section 18. Air entering into the fan section 12 is initially compressed and a portion fed to the compressor section 14. Bypass air flow 301 provides some of the propulsion force from the engine. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded across the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust duct 22. Some bypass air 302 passes within the duct 22 as cooling air. An inner liner for the exhaust duct 22 protects outer surface 82 from the hot gasses 28 escaping from the augmentor section 20 and the turbine section 18. Of course, this application extends to engines without an augmentor section.

As one may appreciate, there may be several liners in the engine 10. Liner 55 is in the exhaust duct 22. Liner 60 is in the augmentor section 20 and liner 65 is in the turbine section 18. The liners 55, 60 and 65, however, may be in more than one piece and are constructed generally of axial segments. For instance, duct liner 55 may have an upstream segment 75 and a downstream segment 80 (See FIG. 2).

Figure 2:
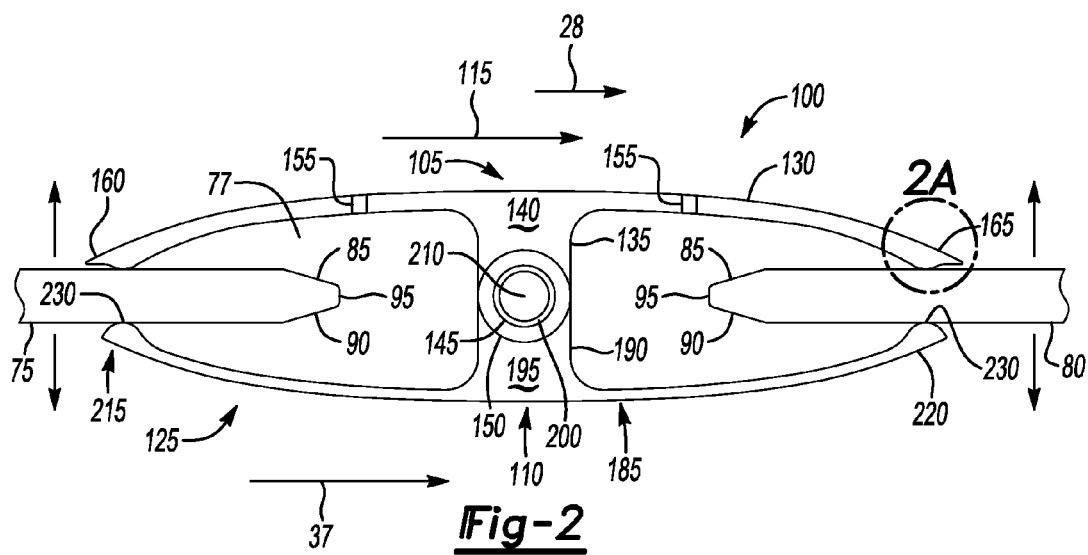
FIG. 2 is a side-view of a seal used between adjacent ducts taken along the lines 2-2 of FIG. 1.
Figure 3:
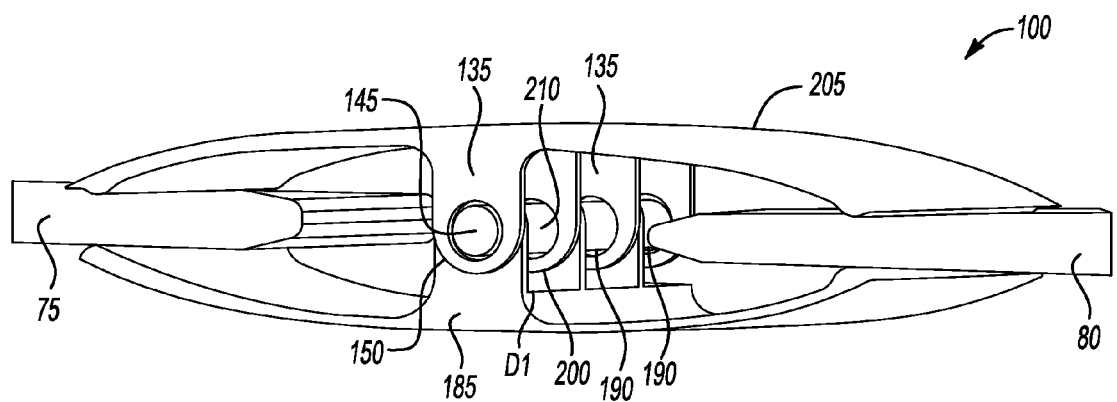
FIG. 3 is a perspective side-view of a first embodiment of the seal of FIG. 2.
Figure 4:
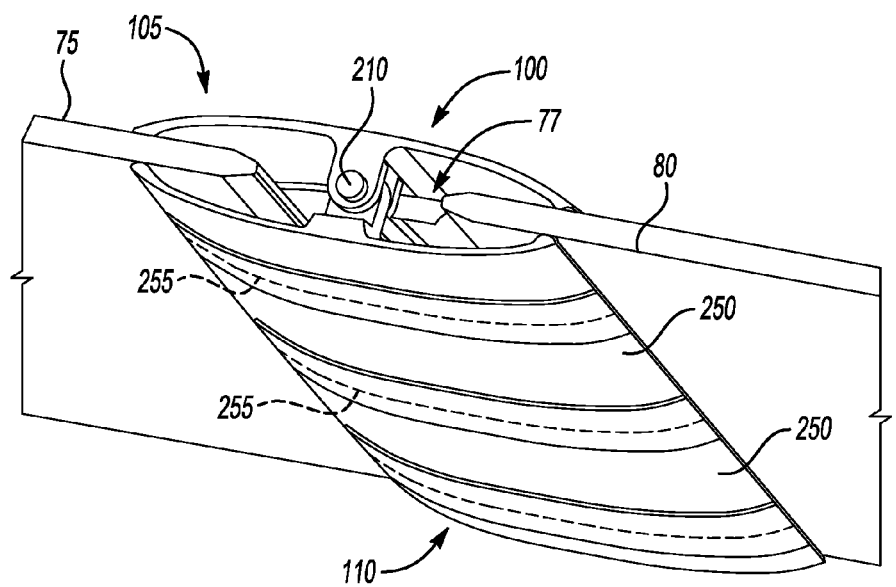
FIG. 4 is a perspective inner view of a segmented seal of FIG. 2.

Referring now to FIGS. 2-4, the liner 55 has an upstream segment 75 and a downstream segment 80 separated by a gap 77. Each of the upstream and downstream segments 75 and 80 has a radially inner chamfer 85 and a radially outer chamfer 90 and an edge formed therebetween 95. A seal 100 bridges the gap between the upstream segment 75 and the downstream segment 80. The seal 100 is shaped like a clamshell and has a radially inner half 105, a radially outer half 110 that are both disposed radially outward from an axial centerline 115.

The radial inner half 105 has an arcuate body 130 and radially outwardly extending fingers 135 which extend from a central area 140 of the arcuate body 130. The arcuate body 130 is thicker than the body of the radially outer half 110 as will be discussed infra. Each finger 135 has an opening 145 near a remote end 150 thereof. Each of the fingers is separated by a distance D1, as will be discussed infra. The arcuate body 130 may have one or more vents 155 to prevent any pressure buildup between the radial inner half 105 and the radial outer half 110. The arcuate body 130 has an upstream end 160 and a downstream end 165.

Figure 2A:
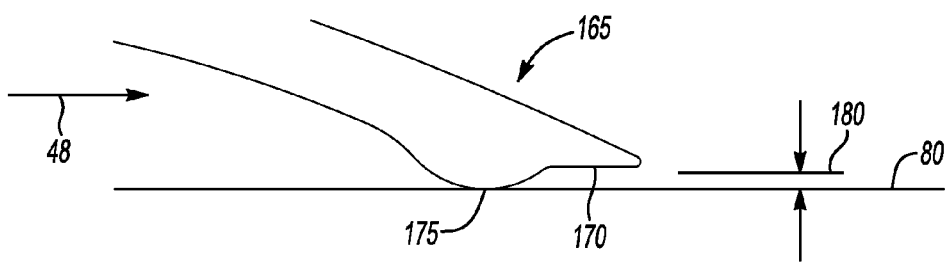
FIG. 2A is a side-view of the seal taken along the lines 2-2 of FIG. 2.

Referring to FIG. 2A, each of the upstream end 160 and the downstream end 165 has a flat portion 170 that is offset from each of the streamed portion and the downstream portions 75 and 80 by an arcuate bump 175 that comes into contact with the upstream portion and the downstream portion (see FIG. 2A). A gap 180 is formed between the flat portion and the liner to allow relative motion of the seal 100 about the upstream segment 75 and a downstream segment 80.

The radial outer half 110 has an arcuate body 185 with radially inwardly extending fingers 190, each of which extends outwardly from the central area 195 of the arcuate body 185. Each finger has an h 200 near a finger remote end 205 and each of the fingers is also separated by a distance D1. The fingers 190 of the radial outer half mesh with the fingers 135 of the radial inner half to receive a pin 210 in the holes 200 in the radially outer half and the openings 145 and the fingers 135 of the radial inner half 105. The pin 210 locks the radial outer half 110 to the radial inner half 105. The arcuate bodies 130 and 185 are convex sides 187 facing each other.

The radial outer half 110 has an upstream end 215 and a downstream end 220. Each of the upstream end and the downstream end have an arcuate bump 230 extending from the upstream end 215 and the downstream end 220 that comes in contact with each of the upstream liners 75 and the downstream segment 80 to relative motion of the seal 100 about the upstream segment 75 and a downstream segment 80.

The arcuate body of the radial outer half 110 is thinner than the body 130. The thinness promotes cooling of the radial outer half arcuate body 185, while the thicker arcuate body 130 of the radial inner half 105 helps protect it from heat. Moreover, the radial outer half arcuate body 185 can be springier and thinner to enable the secondary flow 37 press the arcuate bumps 230 against the upstream segment 75 and the downstream segment 80 to provide primary sealing thereby. The secondary flow 37 is higher pressure and cooler than the hot exhaust stream 28 of gas.

In operation, the edges 95 and the radially inner chamfer and the radially outer chamfer 85, 90, enable the upstream ends 160 and 215 to be separated by the chamfer surfaces and allow the seal 100 to be slid across the upstream segment 75. Similarly, the downstream segment 80 may be inserted through the arcuate bump 230 and the arcuate bump 175 of the radial inner half 105 and the radial outer half 110. Alternatively, the radial inner half 105 and the radial outer half 110 may be placed against the upstream segment 75 and the downstream segment 80 and then compressed while the pin 210 is snaked through the openings 145.

Figure 5:
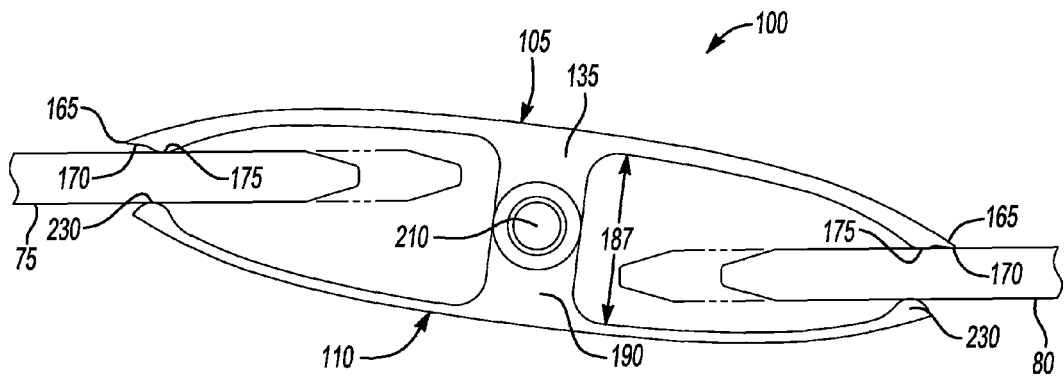
FIG. 5 is a side-view of the seal of FIG. 2 in operation.

Because the normal spacing between the upstream ends 160, 215 of the radial inner half 105 and the radial outer half 110 is less than the thickness of the upstream segment 75 and the downstream segment 80, the seal 100 becomes spring loaded against the upstream segment 75 and the downstream segment 80. Pressure from the secondary flow 37 pushes the radial outer half 110 and the contact bumps 230 against the radial upstream segment 75 and the downstream segment 80, thereby providing the primary seal. The vents 155 minimize the probability that air will leak under the gap 180 and the arcuate bumps 175 to allow the air to pressurize the area 255 between the radial inner half 105 and the radial outer half 110 so that neither of the radial inner half or the radial outer half 110 are lifted away from the upstream segment 75 or the downstream segment 80. Because the radial inner half 105 and the radial outer half 110 are free to rotate about the pin 235, the parts may rotate about the pin to allow relative motion between the seal 100 and the upstream segment 75 and the downstream segment 80 (see FIG. 5). However, motion between the seal 100 and the upstream segment 75 and a downstream segment 80 may be limited if the gap 180 is closed and the downstream end 165 contacts either the upstream segment 75 or the downstream segment 80.

Figure 4A:
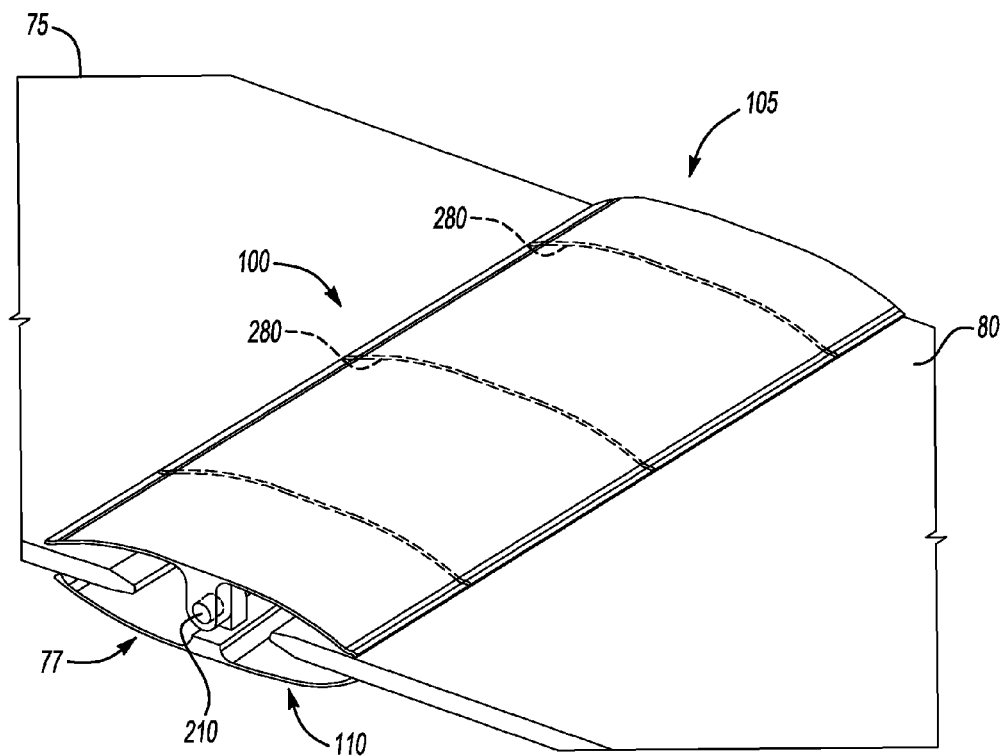
FIG. 4A is a perspective outer view of a segmented seal of FIG. 2

Referring now to FIGS. 4 and 4a, because many ducts and liners 55 have contoured shapes, the seal 100 must be able to conform to the contoured shapes. In this instance the liner 55 is annularly shaped. In order for the seal 100 to seal the gap 77, the radial outer half 110 may be made of radial outer members 250 separated by narrow slots or kerfs 255. A band 260 covers each slot 255. The band 260 may be glued on one member 255 and forced against an adjacent member 255 by the secondary flow 37 to seal each slot 255 from air leakage therethrough thereby maintaining the seal.

In order for the seal 100 to seal the gap 77, the radial outer half 110 may be made of a plurality of abutting radial outer members 250 that may be separated by narrow clefts 255. A band 260 covers each cleft 255. The band 260 may be glued on one radial outer member 255 and forced against an adjacent radial outer member 255 by the secondary flow 37 to seal each cleft 255 from air leakage therethrough thereby maintaining the seal. Because the seal 100 is segmented by the radial outer members 255, the radial outer members 250 have enough bend about the clefts 255 to maintain a shape of the liner 55 while maintaining a seal.

Similarly, the radial inner half 105 may be made of a plurality of abutting radial inner members 270 that may be separated by narrow clefts 275. Because the seal 100 is segmented by the radial inner members 275, the radial inner members have enough flexibility to maintain a curve of the liner 55 while maintaining a seal. Because the radial inner half 105 experiences the lower pressure provided by the hot exhaust stream 28, it is not necessary to provide band 260 on the radial inner half 105 which may also have clefts 280 about which the radial inner members may rotate to maintain a curve of the liner 55.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A seal for a duct, said duct having a upstream portion and a downstream portion, said upstream portion and said downstream portion separated by a first gap, said seal comprising:
    a first portion having a length greater than a width of said first gap between said upstream portion and said downstream portion, said first portion having a first thickness in a direction substantially perpendicular to said length of said first portion, a first upstream end, and a first downstream end;
    a second portion having a length greater than a width of said first gap between said upstream portion and said downstream portion, said second portion having a second thickness in a direction substantially perpendicular to said length of said second portion, a second upstream end, and a second downstream end, wherein said first thickness is thicker than said second thickness;
    an attachment between said first portion and said second portion such that said first portion and said second portion move relative to each other, wherein said first portion is inside said duct and said second portion is outside of said duct,
    wherein said attachment comprises:
        a first finger extending in a first direction from said first portion towards said second portion;
        a second finger extending in a second direction parallel to said first direction from said second portion towards said first portion, each of said first and second fingers including an opening in a radially outer portion thereof; and
        an axle extending through said opening in said first finger and said opening in said second finger, said axle extending along an axis perpendicular to said first and second directions, said axle arranged such that said first and second fingers rotate about said axis;
    wherein said first portion and said second portion are spring loaded against said duct upstream portion and said duct downstream portion; and
    wherein each said first portion and said second portion are arcuate along substantially the entire length of said first portion and the entire length of said second portion, respectively, and a concave side of the first portion faces a concave side of the second portion.

2. The seal of claim 1 wherein said second thickness is thinner than said first thickness.

3. The seal of claim 1 wherein said second thickness is thinner than said first thickness and is disposed in a higher pressure environment than a lower pressure environment in which said first thickness is disposed.

4. The seal of claim 1 wherein each of said upstream ends and said downstream ends have rotation points that rotate said first portion and said second portion about said upstream portion and said downstream portion.

5. The seal of claim 4 wherein one of the first portion and the second portion are disposed radially inwardly within said duct, said one of the first portion and the second portion having an extension extending distally beyond said a rotation point on either of said upstream end or said downstream end.

6. The seal of claim 5 wherein said rotation point is provided by a bump, and said extension is provided by a flat portion projecting from said bump, said bump projecting outward of said flat portion to provide a gap therebetween, said gap allowing motion of said seal relative to said duct.

7. The seal of claim 1 wherein said second portion is segmented into adjacent members separated by a cleft.

8. The seal of claim 7 wherein said cleft is covered by a band attaching to one of said adjacent members and is forced against another of said adjacent members by pressure.

9. The seal of claim 1 wherein, at substantially a midpoint of said length of said first portion, a thickness of said first portion is greater than a thickness of said second portion at substantially a midpoint of said length of said second portion.

10. A seal for sealing a first gap between a higher temperature, lower pressure first flow path and a lower temperature, higher pressure second flow path in a gas turbine engine, said seal comprising:
    a first portion having a length greater than a width of said first gap, said first portion disposed in said higher temperature, lower pressure first flow path, said first portion having a first thickness in a direction substantially perpendicular to said length of said first portion, a first upstream end, and a first downstream end;
    a second portion having a length greater than a width of said first gap, said second portion disposed in said higher pressure, lower temperature second flow path, said second portion having a second thickness in a direction substantially perpendicular to said length of said first portion, a second upstream end, and a second downstream end;

an attachment between said first portion and said second portion such that said first portion and said second portion move relative to each other;
wherein said attachment comprises:
 a first finger extending in a first direction from said first portion towards said second portion;
 a second finger extending in a second direction parallel to said first direction from said second portion towards said first portion, each of said first and second fingers including an opening in a radially outer portion thereof; and
 an axle extending through said opening in said first finger and said opening in said second finger, said axle extending along an axis perpendicular to said first and second directions, said axle arranged such that said first and second fingers rotate about said axis; and
each said first portion and said second portion are arcuate along substantially the entire length of said first portion and the entire length of said second portion, respectively, and a concave side of the first portion faces a concave side of the second portion.

11. The seal of claim 10 wherein said first thickness is thicker than said second thickness.

12. The seal of claim 10 wherein said first gap is between an upstream portion and a downstream portion of a duct.

* * * * *